United States Patent
Nakagawa et al.

(10) Patent No.: US 6,588,496 B2
(45) Date of Patent: Jul. 8, 2003

(54) AIR CONDITIONER FOR VEHICLE

(75) Inventors: Nobuya Nakagawa, Nishi-kasugai-gun (JP); Hajime Izumi, Takasago (JP); Tetsuo Tominaga, Takasago (JP); Toshihisa Kondo, Nishi-kasugai-gun (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/173,244

(22) Filed: Jun. 18, 2002

(65) Prior Publication Data

US 2003/0003859 A1 Jan. 2, 2003

(30) Foreign Application Priority Data

Jun. 27, 2001 (JP) .......................... 2001-195006

(51) Int. Cl.[7] ................................ B60H 1/32
(52) U.S. Cl. .................. 165/42; 454/121; 454/156; 454/160; 454/261
(58) Field of Search .................... 165/41, 42, 43, 165/103; 454/121, 156, 159, 160, 161, 261, 266, 267, 268, 269

(56) References Cited

U.S. PATENT DOCUMENTS

| | | | | |
|---|---|---|---|---|
| 4,852,638 A | * | 8/1989 | Hildebrand et al. | ......... 165/42 |
| 5,960,859 A | * | 10/1999 | Sakurai | ............ 165/43 |
| 5,988,263 A | * | 11/1999 | Schwarz | ............ 165/41 |
| 6,007,421 A | * | 12/1999 | Schwarz | ............ 454/156 |
| 6,368,207 B1 | * | 4/2002 | McLaughlin et al. | ....... 454/156 |
| 6,478,671 B2 | * | 11/2002 | Murai et al. | ............... 454/156 |

FOREIGN PATENT DOCUMENTS

| | | | |
|---|---|---|---|
| DE | 197 18 736 | | 6/1998 |
| EP | 1 040 946 | | 10/2000 |
| JP | 3-57713 | * | 3/1991 |

* cited by examiner

*Primary Examiner*—Harold Joyce
(74) *Attorney, Agent, or Firm*—Oblon, Spivak, McClelland, Maier & Neustadt, P.C.

(57) ABSTRACT

An air conditioner for a vehicle comprises an air conditioner housing and an air intake formed in the air conditioner housing. An evaporator is disposed downstream of the air intake and an heater core is disposed downstream of the evaporator. Vent and foot outlets are formed in the housing downstream of the evaporator. The air conditioner further includes a first passage defined between the evaporator and the heater core and a guide plate disposed downstream of the heater core for directing hot air heated by passing through the heater core toward cool air not passing through the heater core. The air conditioner further includes means for conducting part of the hot air from the heater core guided by the guide plate to the vent outlet and/or for conducting part of the cool air not passing through the heater core to the foot outlet, and a first distributing mechanism for opening and closing the vent outlet and for selectively directing mixed air composed of the cool air from the evaporator and the hot air from the heater core guided by the guide plate toward the vent outlet and/or the foot outlet.

5 Claims, 3 Drawing Sheets

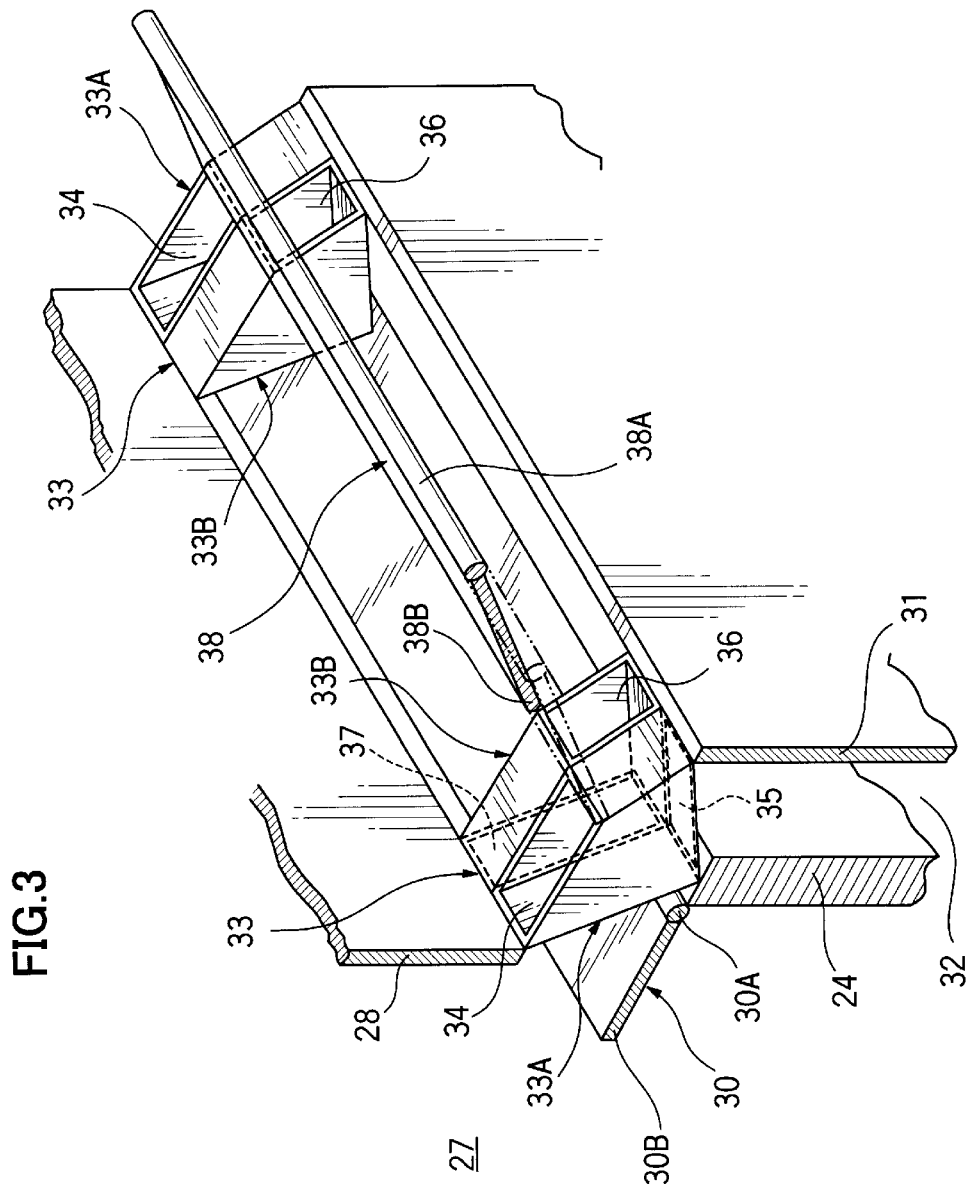

AIR CONDITIONER FOR VEHICLE

BACKGROUND OF THE INVENTION

1. Field of the Invention

This invention relates to an air conditioner for a vehicle, and in particular to an air conditioner that minimizes temperature difference between mixed airs fed to different outlets.

2. Description of the Related Art

Car air conditioning systems have been known for many years. A car air conditioning system is generally provided with a vent outlet, a defrost outlet and a foot outlet, which have to be supplied with not only solely warm air or solely cool air but also both warm air and cool air. When both warm air and cool air are fed to these outlets, these airs have to be mixed upstream of the outlets and then fed to the outlets as a mixed air, because if the warm air and the cool air are separately supplied to the outlets, the desired air temperature cannot be obtained at the outlets.

Thus, in order to meet this requirement, conventional car air conditioning systems utilize, for example, a structure as shown in FIG. 1.

As illustrated, a car air conditioner 1 comprises an air conditioner housing 2 provided at its upstream portion with an air intake 3 into which ambient air and/or recirculated air from the car's passenger compartment is introduced. An evaporator 4 is provided downstream of the air intake 3 and a heater core 5 is provided downstream of the evaporator 4. A vent outlet 6 and a foot outlet 7 are provided downstream of the evaporator 4 and above the heater core 5.

A first pivoted valve 8 for selectively directing cool air from the evaporator 4 to the vent outlet 6 and the foot outlet 7 and/or the heater core 5 is provided in a first passage defined between the evaporator 4 and the heater core 5.

A second pivoted opening/closing valve 9 is provided downstream of the first pivoted valve 8 for opening and closing the vent outlet 6 and for selectively directing mixed air composed of cool air from the evaporator 4 and hot air from the heater core 5 to the vent outlet 6 and/or the foot outlet 7.

A third pivoted opening/closing valve 11 is provided downstream of the second pivoted valve 9 for opening and closing the foot outlet 7 and for selectively directing the mixed air coming from the second pivoted valve 9 to the foot outlet 7 and/or a defrost outlet 10 provided below second pivoted valve 9. A fourth pivoted opening/closing valve 12 is provided for opening and closing the defrost outlet.

In designing and producing cars, the manufacturer needs to provide the passenger(s) with as comfortable a cabin space as possible. In view of this need, the car air conditioning system is required to be downsized as much as possible.

The air conditioning system 1 was designed to satisfy this requirement for compactification. Owing to the compactification, however, the air conditioning system 1 cannot provide sufficient mixing space for mixing the hot air heated by passing through the heater core 5 and the cool air not passing therethrough.

Therefore, when the mixed air is supplied to, for example, the vent outlet 6 and the foot outlet 7 in the air conditioning system 1 shown in FIG. 1, most of the cool air not passing through the heater core 5 flows into the vent outlet 6 while most of the hot air from the heater core 5 flows into the foot outlet 7. Consequently, these outlets cannot supply the mixed air at the desired temperature and the vehicle passenger(s) may feel uncomfortable due to the fact that there is a considerable difference between the temperature of the mixed air blown from the vent outlet 6 and that of the mixed air from the foot outlet 7.

SUMMARY OF THE INVENTION

It is therefore an object of the present invention to provide an air conditioner for a vehicle capable of minimizing temperature difference between mixed airs to be fed to different outlets.

The present invention achieves this object by providing an air conditioner for a vehicle comprising an air conditioner housing; an air intake formed in said air conditioner housing; an evaporator disposed downstream of said air intake; a heater core disposed downstream of said evaporator; vent and foot outlets formed in said housing downstream of said evaporator; a first passage defined between said evaporator and said heater core; a guide plate disposed downstream of said heater core for directing hot air heated by passing through said heater core toward cool air not passing through said heater core; means for conducting part of said hot air from said heater core guided by said guide plate to said vent outlet and/or for conducting part of said cool air not passing through said heater core to said foot outlet and a first distributing mechanism for opening and closing said vent outlet and for selectively directing mixed air composed of said cool air from said evaporator and said hot air from said heater core guided by said guide plate toward said vent outlet and/or said foot outlet.

In accordance with the air conditioner of the present invention, by means of the conducting means disposed in a space or area insufficient to mix hot air from a heater core and cool air not passing through the heater core, part of the hot air can be forcedly fed to a vent outlet to which a large amount of cool air tends to be fed, and part of the cool air can be forcedly fed to a foot outlet to which a large amount of hot air tends to be fed, thereby minimizing the temperature difference between the mixed airs fed to the respective outlets.

In the present invention, the conducting means preferably comprise a vertical duct member for directing a portion of the hot air from the heater core guided by the guide plate toward the vent outlet and a horizontal duct member for directing a portion of the cool air not passing through the heater core toward the foot outlet.

Additionally, the vertical duct member and the horizontal duct member preferably share at least one constituent wall.

The above and other objects and features of the present invention will be apparent from the following description made with reference to the accompanying drawings showing a preferred embodiment of the present invention.

BRIEF DESCRIPTION OF THE DRAWINGS

In the accompanying drawings:

FIG. 3 is a schematic, partially enlarged perspective view of the car air conditioning system of FIG. 2.

DETAILED DESCRIPTION

A preferred embodiment of the present invention will be described hereinbelow with reference to the accompanying drawings.

Figure 1:
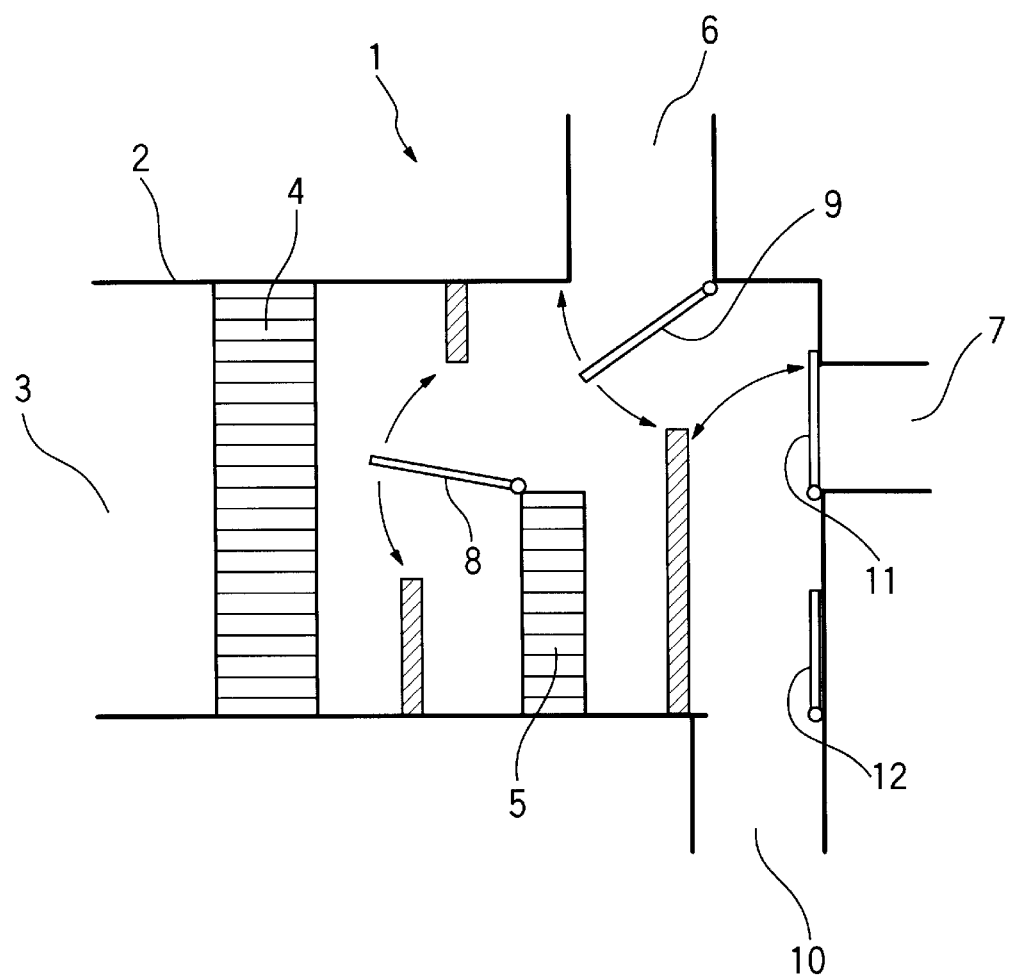
FIG. 1 is a schematic side sectional view of a conventional car air conditioning system.
Figure 2:
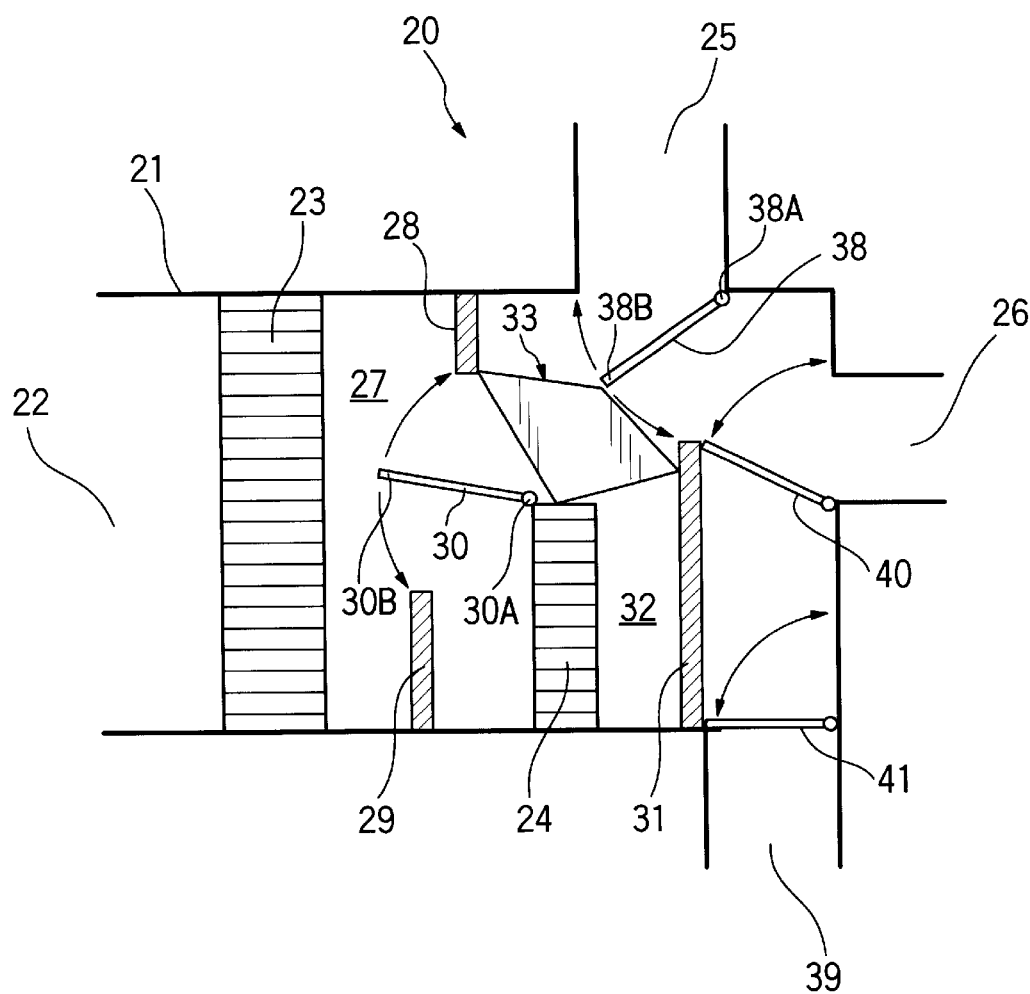
FIG. 2 is a schematic side sectional view of a car air conditioning system that is an embodiment of the present invention.

Referring to FIGS. 2 and 3, an air conditioner for a vehicle generally indicated by reference numeral 20 comprises an air conditioner housing 21, which is provided at its front portion facing toward the front of the car with an air intake 22 for taking in outside air and/or inside air from the passenger compartment.

An evaporator 23 is provided downstream of the air intake 22 and a heater core 24 is provided downstream of the evaporator 23. A vent outlet 25 and a foot outlet 26 are provided downstream of the evaporator 23 and above the heater core 24.

A first distributing mechanism for selectively directing cool air from the evaporator 23 to the vent outlet 25 and the foot outlet 26 and/or the heater core 24 is provided in a first passage 27 defined between the evaporator 4 and the heater core 5.

In the present embodiment, the first distributing mechanism includes a first stopper plate 28 downwardly extending from a top wall of the housing 21 (preferably upstream of the heater core 24 and the vent outlet 25), a second stopper plate 29 upwardly extending from a bottom wall of the housing 21 between the evaporator 23 and the heater core 24, and a first pivoted valve plate 30.

The first pivoted valve plate 30 has a proximal end portion 30A pivotably mounted on the heater core 24 and a free end portion or distal end portion 30B and is adapted to be pivoted around the proximal end portion 30A so that the distal end portion 30B can be abutted against a lower end portion of the first stopper plate 28 and an upper end portion of the second stopper plate 29.

In the present embodiment, all of the first stopper plate 28, the second stopper plate 29 and the first pivoted valve plate 30 extend across the whole width of the housing 21.

A guide plate 31 is provided downstream of the heater core 24 for directing hot air heated by passing through the heater core 24 toward cool air not passing through the heater core 24, and a second passage 32 is defined between this guide plate 31 and the heater core 24. The guide plate 31 also extends across the whole width of the housing 21 in the present embodiment.

The air conditioning system 20 further comprises means for conducting or directing a portion of the hot air exiting from the heater core 24 toward the vent outlet 25, and a portion of the cool air not passing through the heater core 24 toward the foot outlet 26.

In this present embodiment, the conducting means is defined by conducting ducts 33 disposed at opposite lateral ends of the housing 21. As can be better seen in FIG. 3, each of the conducting ducts 33 consists of a vertical duct member 33A for directing a portion of the hot air exiting from the heater core 24 and flowing through the second passage 32 toward the vent outlet 25, and a horizontal duct member 33B for directing a portion of the cool air not passing through the heater core 24 toward the foot outlet 26.

The vertical duct member 33A is a vertically extending duct box having upper 34 and lower 35 open end portions. The lower open end portion 35 receives a portion of the hot air from the second passage 32 and the upper open end portion 34 delivers the hot air coming from the lower open end portion 35 toward the vent outlet 25. The horizontal duct member 33B is a horizontally extending duct box having rear 36 and front 37 open end portions. The front open end portion 37 receives a portion of the cool air not passing through the heater core 24 and the rear open end portion 36 delivers the cool air coming from the front open end portion 37 toward the foot outlet 26.

In the conducting duct 33 disposed at the left side of the housing 21 when viewed in FIG. 3, a right side wall of the vertical duct member 33A and a left side wall of the horizontal duct member 33B are defined by the same plate member, thereby using the space in the housing 21 more efficiently than a case where the vertical duct member 33A and the horizontal duct member 33B are individually formed.

In the present invention, each of the conducting ducts 33 is fixed to the housing 21 by attachment of its rear end portion to the guide plate 31, attachment of its lower end portion to the heat core 24, and attachment of its front end portion to the first stopper plate 28.

Downstream of the first pivoted valve plate 30 and the conducting ducts 33, a second distributing mechanism constituted by a second pivoted opening/closing valve plate 38 is provided for opening and closing the vent outlet 25 and for selectively directing mixed air composed of cool air from the evaporator 23 and hot air from the second passage 32 toward the vent outlet 25 and/or the foot outlet 26. The second pivoted opening/closing valve plate 38 has a proximal end portion 38A pivotably attached to the vent outlet 25 and a free end portion or distal end portion 38B and is adapted to be pivoted around the proximal end portion 38A so that the distal end portion 38B can be abutted against the top wall of the housing 21 and the guide plate 31. When the distal end portion 38B is abutted against the top wall of the housing 21, the second pivoted opening/closing valve plate 38 is in its closed position in which the vent outlet 25 is fully closed. On the other hand, when the distal end portion 38B is abutted against the guide plate 31, the second valve plate 38 is in its open position in which the vent outlet 25 is fully opened.

In the present embodiment, the second pivoted opening/closing valve plate 38 extends across the whole width of the housing 21.

Downstream of the second pivoted valve plate 38, a third distributing mechanism constituted by a third pivoted opening/closing valve plate 40 is provided for opening and closing the foot outlet 26 and for selectively directing the mixed air coming from the second pivoted valve plate 38 toward the foot outlet 26 and/or a defrost outlet 39 provided downstream of the foot outlet 26. The defrost outlet 39 is provided with a fourth pivoted opening/closing valve plate 41 for opening and closing the defrost outlet 39.

Each of the first through fourth valve plates 30, 38, 40 and 41 is adapted to be driven, in a conventional way, to a predetermined position depending on one of various modes selected by an air conditioner control (not shown) disposed, for example, near the driver's seat.

The operation of the car air conditioning system 20 will now be described below taking as an example the mode in which mixed air composed of cool air and hot air is supplied from both the vent outlet and the foot outlet.

When this mode is selected by the air conditioner control, the first pivoted valve plate 30 is, as shown in FIG. 2, pivoted around the proximal end portion 30A so that the distal end portion 30B is positioned between the lower end portion of the first stopper plate 28 and the upper end portion of the second stopper plate 29, to distribute the cool air from the evaporator 23 to the vent outlet 25/the foot outlet 26 (hence, the conducting ducts 33) and the heater core 24. The position to which the first pivoted valve plate 30 is pivoted differs depending on the temperature set by the air conditioner control.

The second pivoted opening/closing valve plate 38 is, as shown in FIG. 2, pivoted around the proximal end portion 38A so that the distal end portion 38B is positioned between the top wall of the housing 21 and the upper end portion of the guide plate 31, to distribute mixed air composed of hot air exiting from the heater core 24 and passing through the second passage 32 and cool air not passing therethrough to the vent outlet 25 and the foot outlet 26. If it is desired to feed the same amount of the mixed air to each of the vent outlet 25 and the foot outlet (the defrost outlet), the distal end portion 38B is positioned at the center between the top wall of the housing 21 and the upper end portion of the guide plate 31. If it is desired to feed the different amount of the mixed air to the respective outlets 25 and 26, the distal end portion 38B of the second valve plate 38 is displaced from said center position according to the amount the mixed air to be fed to the respective outlets.

Part of the mixed air distributed by the second valve plate 38 flows into the vent outlet 25 and the remainder thereof is directed to the foot outlet 26 by the third valve plate 40 fully opening the foot outlet 26 and is prevented from flowing into the defrost outlet 39 by the fourth valve plate 41 fully closing the defrost outlet 39.

As in the conventional air conditioning system explained earlier, the present system 20 also lacks a mixing space sufficient for mixing hot air and cool air. However, the conducting means of the present system 20 cause a portion of the hot air from the second passage 32 to be forcedly fed to the vent outlet 25 and a portion of the cool air to be forcedly fed to the foot outlet 26 (toward the defrost outlet 39), thereby minimizing the temperature difference between the mixed airs fed to the respective outlets.

Specifically, due to the fact that part of the hot air from the second passage 32 passes through each vertical duct member 33A, i.e., enters at its lower open end portion 35 and exits from its upper open end portion 34, the parts of the hot air passing through the vertical duct members 33A can be directed to the vent outlet 25 without being affected by the cool air which did not pass through the heater core 24, to be mixed with the cool air directed toward the vent outlet 25, thereby increasing the temperature of the mixed air fed to the vent outlet 25. On the other hand, due to the fact that part of the cool air not passing through the heater core 24 passes through each horizontal duct member 33B, i.e., enters at its front open end 37 and exits from its rear open end 36 36, the parts of the cool air passing through the horizontal duct members 33B can be directed to the foot outlet 26 (toward the defrost outlet 39) without being affected by the hot air from the second passage 32, to be mixed with the hot air directed toward the foot outlet 26 (the defrost outlet 39), thereby decreasing the temperature of the mixed air fed to the foot outlet 26 (toward the defrost outlet 39). Thus, the passing of these airs through the duct members 33A and 33B minimizes the temperature difference between the mixed air fed to the vent outlet 25 and that fed to the foot outlet 26.

Although the present invention has been described with reference to a specific, preferred embodiment, those skilled in the art will recognize that various modifications and improvements can be made while remaining within the scope and spirit of the present invention. The scope of the present invention is determined solely by the appended claims.

For example, although in the above embodiment the conducting ducts 33 are disposed at the opposite lateral ends of the housing 21, the positions of the ducts 33 are not limited to the lateral ends of the housing 21. That is, the conducting ducts 33 may be disposed at any positions in the lateral direction of the housing 21.

Moreover, the number of ducts 33 may be only one or be three or more.

Furthermore, the conducting means may consist of only a vertical duct member(s) for conducting a portion of the hot air passing through the second passage 32 to the vent outlet 25 and may consist of only a horizontal duct member(s) for conducting a portion of the cool air not passing through the heater core 24 to the foot outlet 26. The number of each of said vertical duct members and said horizontal duct members is not limited and each of these duct members may be disposed at any positions in the lateral direction of the housing 21.

What is claimed is:

1. An air conditioner for a vehicle comprising:

an air conditioner housing;

an air intake formed in said air conditioner housing;

an evaporator disposed downstream of said air intake;

a heater core disposed downstream of said evaporator;

vent and foot outlets formed in said housing downstream of said evaporator;

a first passage defined between said evaporator and said heater core;

a guide plate disposed downstream of said heater core for directing hot air heated by passing through said heater core toward cool air not passing through said heater core;

means for conducting part of said hot air from said heater core guided by said guide plate to said vent outlet and/or for conducting part of said cool air not passing through said heater core to said foot outlet; and a first distributing mechanism for opening and closing said vent outlet and for selectively directing mixed air composed of said cool air from said evaporator and said hot air from said heater core guided by said guide plate toward said vent outlet and/or said foot outlet.

2. The air conditioner of claim 1, wherein said conducting means comprise a vertical duct member for directing a portion of said hot air from said heater core guided by said guide plate toward said vent outlet and a horizontal duct member for directing a portion of said cool air not passing through said heater core toward said foot outlet.

3. The air conditioner of claim 2, wherein said vertical duct member and said horizontal duct member share at least one constituent wall.

4. The air conditioner of claim 1, further comprising a second distributing mechanism disposed downstream of said first distributing mechanism for opening and closing said foot outlet and for selectively directing said mixed air from said first distributing mechanism toward said foot outlet and/or a defrost outlet provided downstream of said foot outlet.

5. The air conditioner of claim 1, further comprising valve means for opening and closing said foot outlet.

* * * * *